United States Patent [19]

Murano et al.

[11] 4,254,401
[45] Mar. 3, 1981

[54] LOCAL DEVICE IN A CONTROL INFORMATION TRANSFER SYSTEM

[75] Inventors: Hatsuo Murano, Yokohama; Yoshio Yamamuro, Tokyo, both of Japan

[73] Assignee: Fujitsu Limited, Kawasaki, Japan

[21] Appl. No.: 810,989

[22] Filed: Jun. 28, 1977

[30] Foreign Application Priority Data

Jul. 7, 1976 [JP] Japan .................................. 51-80711

[51] Int. Cl.³ .............................................. H04Q 9/00
[52] U.S. Cl. .......................... 340/147 C; 340/147 LP
[58] Field of Search ...................... 340/147 LP, 147 C

[56] References Cited

U.S. PATENT DOCUMENTS

| | | |
|---|---|---|
| 3,639,904 | 2/1972 | Arulpragasam ............... 340/147 LP |
| 3,978,451 | 8/1976 | Ito ................................... 340/147 LP |
| 3,979,732 | 9/1976 | Hepworth ...................... 340/147 LP |
| 4,045,774 | 8/1977 | Morrison ........................ 340/147 LP |

Primary Examiner—Harold I. Pitts
Attorney, Agent, or Firm—Staas & Halsey

[57] ABSTRACT

In a control information transfer system in which a central device and a plurality of local devices are respectively interconnected through a control information bus, the local devices are designed to be used in common to the case of the control information bus having the configuration of serial connection suitable for a small system and the case of the control information bus having the configuration of parallel connection suitable for a large system. This is realized by the addition of a very small amount of hardware.

2 Claims, 7 Drawing Figures

LOCAL DEVICE IN A CONTROL INFORMATION TRANSFER SYSTEM

BACKGROUND OF THE INVENTION

1. Field of the Invention

This invention relates to local device for a control information transfer system in which a central device and the local devices are interconnected through a control information bus.

2. Description of the Prior Art

In a control information transfer system in which a central device, (for instance, a channel control unit), and a plurality of local devices, (for example, channels), are respectively interconnected through a control information bus, either the common control information bus in serially-connected from the channel control unit to the respective channels, or the channel control unit is connected in parallel to the channels through information buses equal in number to the channels.

Generally, a small information processing system employs the control information transfer system of the type in which the channels are serially-connected with the common control information bus, and a large information processing system employs a system in which the channel control unit and the channels are individually interconnected with the same number of control information buses as the channels.

Since the control information transfer system of the small information processing system is desired to be provided at a low cost effected by reducing the number of control information buses used, the serially connected bus configuration is provided, said configuration requiring a smaller amount of cable for the information buses, and hence is more economical. On the other hand, in the control information transfer system of the large information processing system, it is desired to increase the throughput in information transfer, so that the parallel connected bus configuration is employed although the number of control information buses used increases. In the case of the serially connected bus, there is the limitation that control information cannot be sent from a channel over the bus until the use of the bus is permitted, because there is the possibility that the bus may be used by another channel which is permitted to use it. However, the parallel connected bus configuration is free from such a restriction and a desired one of the buses can be used immediately.

In the past, local devices of different structures have been produced to comply with the two different bus configurations described above. However, it is disadvantageous in terms of manufacturing cost and mass-productivity to prepare local devices having two different structures.

SUMMARY OF THE INVENTION

Accordingly, an object of this invention is to provide a local device (a channel) which can be used in common with the control information transfer systems of the two different bus configurations described above, thereby removing the abovesaid disadvantage experienced in the prior art.

Another object of this invention is to provide a local device (a channel) which can be used in common with the control information transfer system of the two different bus configurations but does not lower its performance, especially the operating speed during control information transfer.

Still another object of this invention is to provide a local device which can be adapted to be used in common with the control information transfer system of the two different bus configurations by the addition of a minimum amount of hardware.

Other objects, features and advantages of the present invention will hereinafter become more fully apparent from the following description taken in conjunction with the accompanying drawings, which illustrate preferred embodiments of the invention.

DESCRIPTION OF THE PREFERRED EMBODIMENTS

Figure 1:
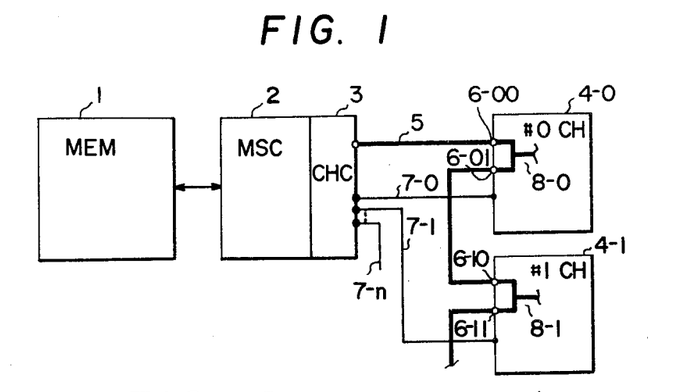
FIG. 1 is a block diagram explanatory of the control information transfer system of the bus configuration of serial connection.

In FIG. 1, reference numeral 1 indicates a main memory MEM; 2 designates a memory control unit MSC; 3 identifies a channel control unit CHC; 4-0, 4-1, . . . denote channels; 5 represents a control information bus to which the channels are respectively connected in a serial manner; 6-00, 6-01, 6-10, 6-11, . . . show connection terminals of the control information bus 5; 7-0, 7-1, . . . 7-n refer to control signal buses; and 8-0, 8-1, . . . indicate terminating (or starting) ends of buses to which information transmitting and receiving circuits are respectively connected.

The channel control unit 3 is one example of a central unit and the channels 4-0, 4-1, . . . are each examples of a local device. The control information bus 5 transmits control information of a relatively low degree of urgency, (for instance, a write byte signal, an error signal, etc.), and the amount of information transmitted is relatively large. The control signal bus 7-0 transmits control signals of the highest degree of urgency, (for example, a request signal, a select-out signal, etc.), and the number of signals transmitted is relatively small. The control signal buses are respectively connected in parallel with the channels 4-0, 4-1, . . . directly from the channel control unit 3 regardless of the construction of the control information bus 5.

In the abovesaid system, the channel, for example, 4-1, sends out control information in the following manner. That is, the channel 4-1 sends a request signal through the control signal bus 7-1. In response to this, the channel control unit 3 sends out a select-out signal to the channel 4-1 through the control signal bus 7-1.

Upon reception of the select-out signal, the channel 4-1 sends out control information to the channel control unit 3 through the control information bus 5. Namely, the channel 4-1 is adapted to use the control information bus 5 after receiving the select-out signal. Where two or more channels have issued request signals, the channel control unit 3 selects one of the channel and applies the select-out signal to the selected channel, so that occurrence of a plurality of request signals does not prevent the above processing.

The data transfer between the channel control unit 3 and the channel 4-1 (or 4-0, ...) is achieved through a data bus not shown.

Figures 2, 3:
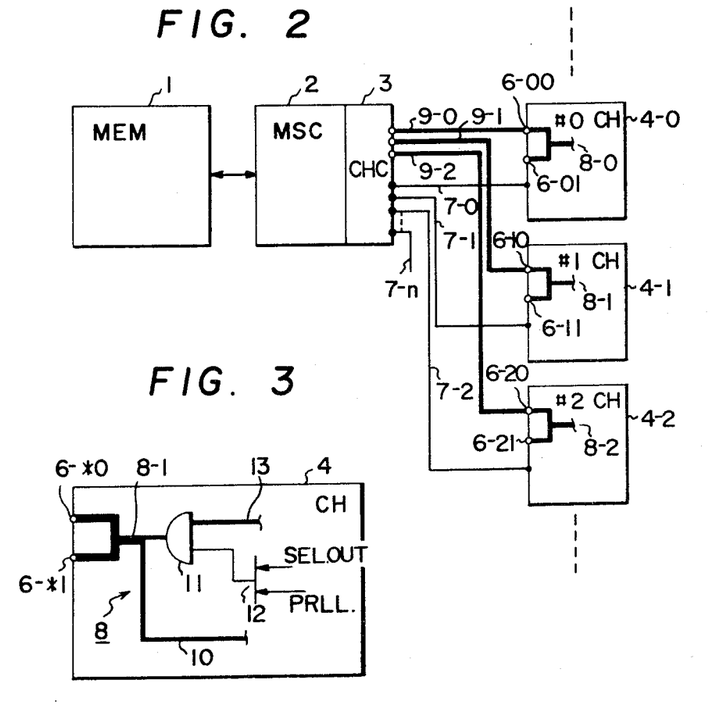
FIG. 2 is a block diagram explanatory of the control information transfer system of the bus configuration of parallel connection.
FIG. 3 is a schematic diagram showing the construction of a local device according to this invention.

FIG. 2 illustrates a control information transfer system of parallel connection. In FIG. 2, reference numerals 1, 2, 3, 4-1, 4-0, ..., 6-00, 6-01, 6-10, 6-11, ..., 7-0, 7-1, ..., and 8 respectively correspond to those in FIG. 1. Reference numerals 9-0, 9-1, 9-2, ... indicate control information buses respectively connected in parallel to the channels 4-0, 4-1, 4-2, ....

In a large-sized information processing system, the channels are usually connected in parallel through the control information buses 9-0, 9-1, .... It is needless to say that in the case of a large-sized system, the memory control unit 2 and the channel control unit 3 are arranged to enable high-degree processings as compared with those shown in FIG. 1. In the information transfer system of FIG. 2, the transfer processing takes places, for example, in the following manner. That is, assuming that the channel 4-1 is to send out control information, the channel 4-1 provides a request signal through the control signal bus 7-1. In this system, the channel control unit 3 is capable of receiving control information immediately after deciding the request signal without the necessity of sending such a select-out signal as described previously in connection with FIG. 1. To perform this, the channel 4-1 is designed to transmit the control information over the control information bus 9-1 immediately after providing the abovesaid request signal.

As briefly described above with regard to FIGS. 1 and 2, the control information buses are connected in series or parallel according to the system used. In this case, if at least the channels 4-0, 4-1, ...) are so constructed as to conform to either of the abovesaid series and parallel connections, it is not necessary to make channels adapted for each of the connections. This provides great merits in manufacture and in use.

FIG. 3 generally shows the construction of a local device according to this invention, that is, a channel in this case. In FIG. 3, reference 4 indicates a channel; 6-*0 and 6-*1 designate terminals, for the connection of control information buses (5 in FIG. 1 and 9-0, 9-1, 9-2, ... in FIG. 2); 8 identifies an information transmitting and receiving circuit, which is connected to a multipoint line 8-1 of the control information bus; 13 denotes a bus which is connected to one part of the multipoint line 8 through an AND circuit and to which a control information sendout part is connected; 10 represents the other part of the multipoint line 8-1, to which a control information receiving part is connected; and 12 shows an OR circuit. Reference character SEL. OUT refers to a select-out signal, which has logic "1" when the channel 4 has received the select-out signal; and PRLL indicates control information bus construction indicating information, which has logic "0" or "1" depending upon whether the system has the serial connection arrangement shown in FIG. 1 or the parallel connection arrangement in FIG. 2.

In the present invention, in order that interfaces of the channel 4 for the channel control unit (3 in FIGS. 1 and 2) may be of the same construction regardless of the control information bus arrangement and that the channel of one kind may be used in common to systems of different control information bus arrangements, the plurality of control information bus connection terminals 6-*0 and 6-*1 are provided and the AND circuit 11 and the OR circuit 12 are provided. And the condition for turning on the AND circuit 11 is selected such that, for example, the OR logic between the select-out signal SEL. OUT and the control information bus arrangement indicating information PRLL. is applied to the AND circuit 11. It is preferred that the control information bus arrangement indicating information PRLL. be applied from the channel control unit 3 to each channel 4. This is to avoid necessity of changing the arrangement on the side of the channel 4 with the construction of the system used.

Where the control information bus of the system employes the arrangement of serial connection shown in FIG. 1, the control information bus arrangement indicating information PRLL. is made to have the logic "0" by the channel control unit 3, for instance, through the control information bus 5. This ensures that only when having received the select-out signal (of the logic "1") from the channel control unit 3, each channel 4 turns on the AND circuit 11, as described above in respect of FIG. 1, thereby to send the control information to the channel control unit 3 through the AND circuit 11.

In contrast, where the control information bus of the system employs the parallel connection arrangement shown in FIG. 2, the control information bus arrangement indicating information PRLL. is made to have the logic "1" by the channel control unit 3, for example, through the control information buses 9-0, 9-1, .... In the case of this system configuration, as described above with regard to FIG. 3, even if the select-out signal SEL. OUT is not present, the AND circuit 11 is always held in the on state since the information PRLL. has the logic "1".

Accordingly, in the case where the channel 4 sends out the control information, as described previously in connection with FIG. 2, the channel 4 produces a request signal, and immediately sends out the information through the AND circuit 11, so that the same operation as described in respect of FIG. 2 is possible.

Where the control information transfer system adopts the serial connection bus configuration depicted in FIG. 1, the control information bus (5 in FIG. 1) is connected to the respective channels in the order of the terminal 6-*0, 6-*1, 6-*0, 6-*1 .... In the case of the parallel connection bus configuration shown in FIG. 2, the control information buses 9-0, 9-1, 9-2, ... are connected to the channel control unit 3, using the terminal 6-*0.

Figure 4:
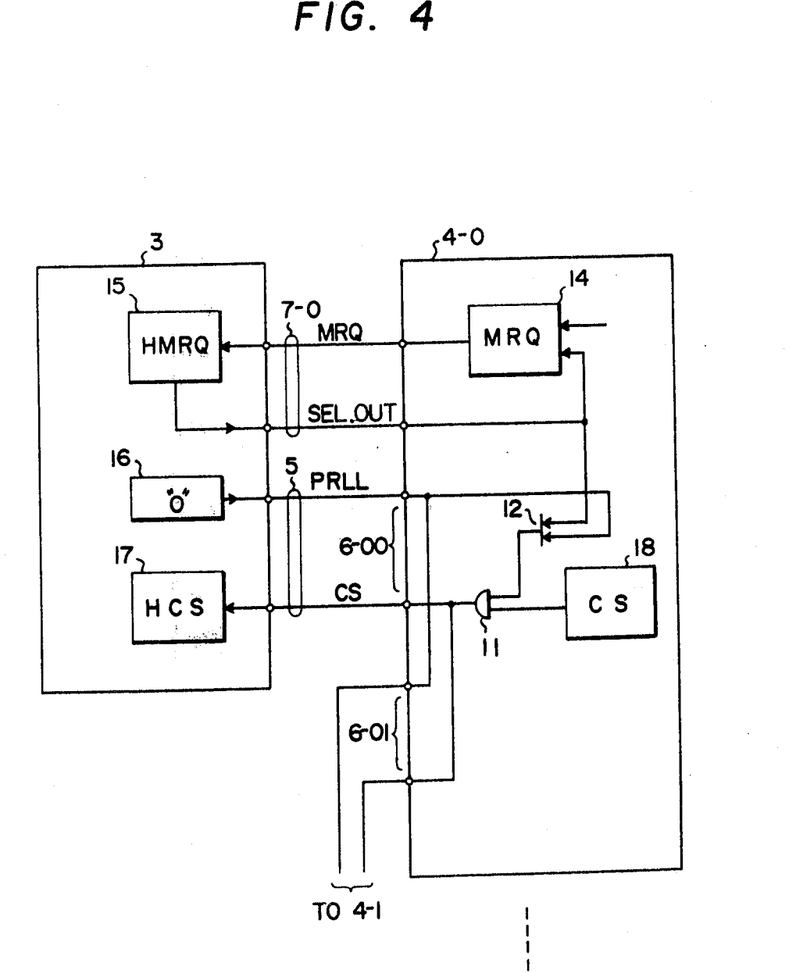
FIG. 4 is a block diagram illustrating the control information transfer system of the bus configuration of serial connection including a local device embodying this invention.

FIG. 4 illustrates in block form the control information transfer system of the bus configuration of serial connection shown in FIG. 1 which employs a local device embodying this invention, in this instance, a channel. Since the entire configuration of the control information transfer system is readily seen from FIG. 1, FIG. 4 shows only those parts necessary for understanding of this invention, and the parts of the channel 4-0 and of the channel control unit 3 which are not so much related to understanding of this invention are omitted.

Figure 5:
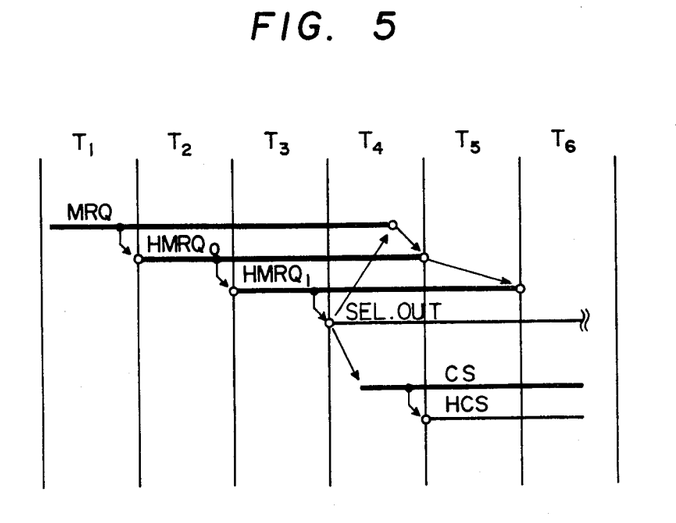
FIG. 5 is a timing chart of the operation of the control information transfer system shown in FIG. 4.

FIG. 5 is a timing chart of the operation of the system depicted in FIG. 4. Let it be assumed that the channels (4-0, . . . ) and the channel control unit 3 operates asynchronously and that timings $T_1$ to $T_6$ in FIG. 5 are produced by clock pulses in the channel control unit 3.

In FIG. 4, for instance, when a request signal MRQ has been generated from a request signal sending control circuit 14 of the channel 4-0 at the timing $T_1$ (refer to FIG. 5), the request signal is applied through one of control signal buses 7-0 to a request signal deciding circuit 15 of the channel control unit 3, by which a decision is made. This decision is achieved by a two-stage operation. That is, at the timing $T_2$, a signal $HMQR_0$ is produced as a result of the first-stage operation and then, by the second-stage operation, a signal $HMQR_1$ is produced at the next timing $T_3$. By the signal $HMQR_1$, the select-out signal SEL. OUT is generated at the timing $T_4$ and a signal of the logic "1" is sent to the channel 4-0 through the control signal bus 7-0. This signal is received by the request signal sending control circuit 14 to stop sending of the request signal MRQ at the timing $T_4$.

On the other hand, in the case of the serial connection bus configuration shown in FIG. 1, a control information bus configuration indicating circuit 16 of the channel control unit 3 has stored therein the logic "0". This signal is applied as the control information bus configuration indicating information PRLL. to one of input ends of the OR circuit 12 through the control information bus 5. Further, the select-out signal SEL. OUT usually has the logic "0", and is applied to the other input end of the OR circuit 12. Accordingly, since the inputs to the both input ends are "0", the output is "0" and the AND circuit 11 to which the above output is applied as one of the inputs thereto is always in the off state.

When the select-out signal SEL. OUT is produced as described above, it is branched and applied to one of the input ends of the OR circuit 12, putting the AND circuit 11 in its on state (at the timing $T_4$). Accordingly, control information CS in a control information sending part 18 is transferred to a control information receiver circuit 17 of the channel control unit 3 through the AND circuit 11 and the control information bus 5 at the timing $T_4$. Upon completion of the timing $T_4$, the transferred control information CS is transferred to required parts at the timing $T_5$. Then by suitable control method, a data transfer is achieved between the channel 4-0 and the channel control unit 3 or between the channel 4-0 and a memory through a data bus not shown.

The control information bus 5 is extended from the connecting terminal 6-01, connected to the connecting terminal 6-00, to the connecting terminal 6-10 of other chanel, for example, 4-1.

Figure 6:
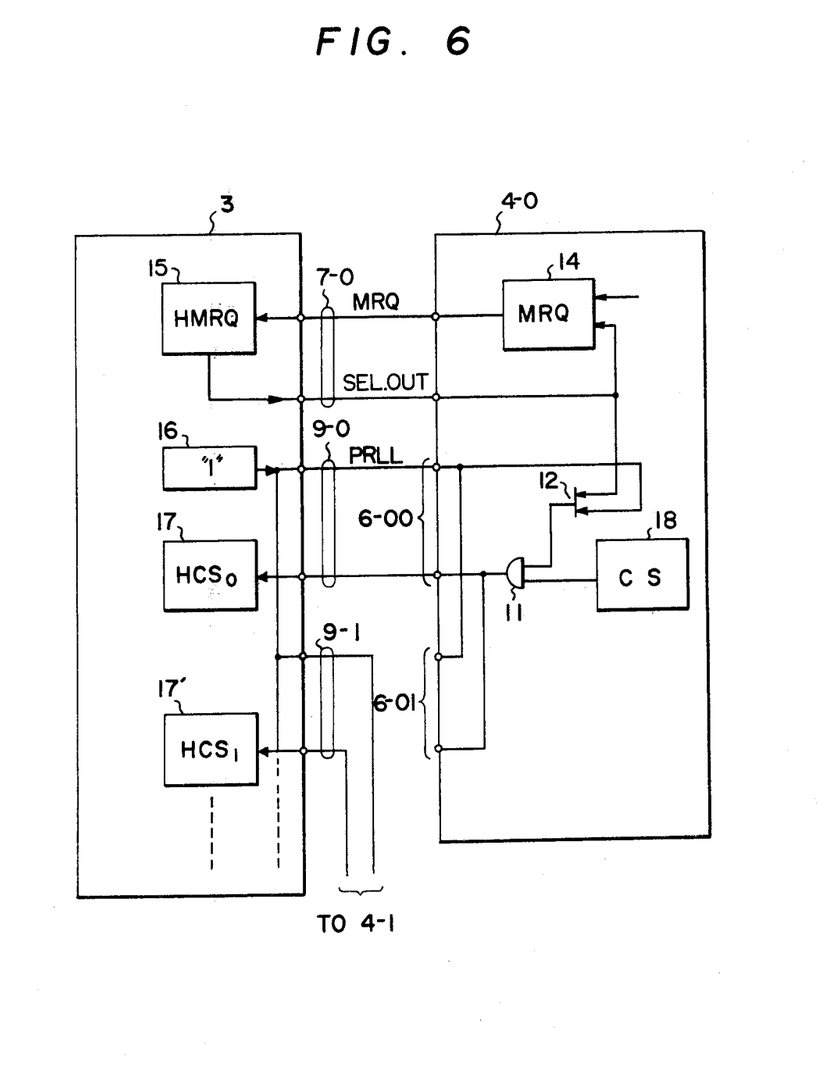
FIG. 6 is a block diagram showing the control information transfer system of the bus configuration of parallel connection including a local device embodying this invention.

FIG. 6 is a block diagram showing the control information transfer system of the bus configuration of the parallel connection depicted in FIG. 2 which employs a local device embodying this invention, in this case, a channel. Since the entire configuration of the control information transfer system is easily understood from FIG. 2, FIG. 6 shows only those parts necessary for understanding of this invention, and the parts of the channel 4-0 and of the channel control unit 3 which are not so much related to understanding of this invention are omitted.

Figure 7:
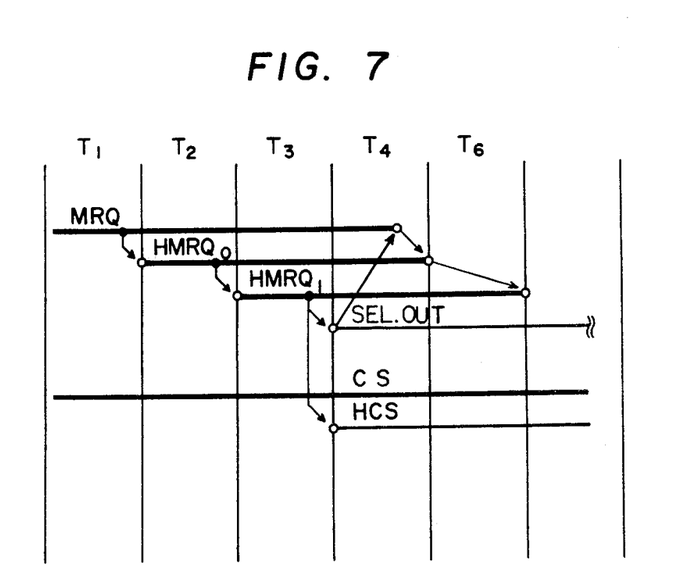
FIG. 7 is a timing chart of the operation of the control information transfer system illustrated in FIG. 6.

FIG. 7 is a timing chart of the operation of the system illustrated in FIG. 6. Let it be assumed that channels (4-0 . . . ) and the channel control unit 3 operate asynchronously and that timings $T_1$ to $T_6$ in FIG. 6 are produced by clock pulses in the channel control unit 3.

In FIG. 6, for example, when the request signal MRQ has been produced from the request signal sending control circuit 14 of the channel 4-0 at the timing $T_1$ (refer to FIG. 7), the request signal is applied through one of the control signal buses 7-0 to the request signal devividing circuit 15 of the channel control unit 3, by which a decision is made. This decision is achieved by a two-stage operation. That is, at the timing $T_2$, a signal $HMQR_0$ is produced as a result of the first-stage operation and then, by the second-stage operation, a signal $HMQR_1$ is produced at the next timing $T_3$. By the signal $HMQR_1$, the select-out signal SEL. OUT is generated at the timing $T_4$ and a signal of the logic "1" is sent to the channel 4-0 through the control signal bus 7-0. This signal is received by the request signal sending control circuit 14 to stop sending of the request signal MRQ at the timing $T_4$.

On the other hand, in the case of the parallel connection bus configuration shown in FIG. 6, the control information bus configuration indicating circuit 16 of the channel control unit 3 has stored therein the logic "1". This signal is applied as the control information bus configuration indicating signal PRLL. to one of the input ends of the OR circuit 12 of the channel 4-0 through the control information bus 9-0. Accordingly, the output from the OR circuit is "1" and the AND circuit 11 to which the above output is applied as one of the inputs thereto is always in the on state. That is, the AND circuit 11 remains in the on state regardless of whether or not the select-out signal SEL. OUT is applied to the other input of the OR circuit 12.

Since the required control information CS is already present in the control information sending part 18 of the channel 4-0 at the moment of sending out the abovesaid request signal MRQ (at the timing $T_1$), the control information is already transferred to the control information receiving circuit 17 of the channel control unit 3 through the AND circuit 11 and the control information bus 9-0. Accordingly, at the moment of sending the select-out signal SEL. OUT (at the timing $T_4$), the control information in the receiving circuit 17 is transferred to required parts in the channel control unit 3. As a result of this, one period of the timing $T_5$ is eliminated and the preparation for data transfer is finished earlier correspondingly.

In the case of FIG. 6, the channel control unit 3 has the control information buses (9-0, 9-1, . . . ) respectively corresponding to the channels (4-0, . . . ) and it is necessary that, for example, a control information receiving circuit 17' similar to the control information receiving circuit 17, is provided for each of the abovesaid buses.

In the foregoing embodiments of this invention (the channel 4-0 in FIGS. 4 and 6), reference numerals 6-00 and 6-01 indicate connection terminal parts for the control information buses (5 or 9-0, 9-1, . . . ) and the corresponding ones of the terminals are respectively interconnected beforehand.

In the manufacture of the local device in accordance with the present invention, (i.e., the channel in the foregoing description), it is only necessary to add the terminal part of the connection for the control information bus and the AND circuit 11 and the OR circuit 12 to the conventional structure and to provide, in the channel control unit 3, one control information bus configuration indicating circuit capable of storing the logic "0" and "1". Accordingly, this invention can be realized by adding a very small amount of hardware to the prior art configuration, and hence is very economical.

Further, in the case of the parallel connection of the control information bus, the speed of the control information transfer operation can be raised by one period as described above and the merits of the parallel connection are not impaired.

Numerous changes may be made in the above described circuits and arrangements and different embodiments of the invention may be made without departing from the spirit thereof; therefore it is intended that all matter contained in the foregoing description and in the accompanying drawings shall be interpreted as illustrative and not in a limiting sense.

What is claimed is:

1. A local device for operation with both serial and parallel control information transfer systems having a central device interconnected by a control information bus to a plurality of local devices, each local device comprising:
    a gate circuit, which becomes conductive either when a control information bus construction indicating information signal has a value indicating that the control information bus is in its parallel configuration with respect to the connection between the central device and the local devices or when a select out signal is transmitted by the central device; and
    a control information transmitting part for transmitting control information, connected to the central device through said gate circuit, by means of said control information bus.

2. A device as in claim 1, wherein said gate circuit comprises an AND gate.

* * * * *

UNITED STATES PATENT AND TRADEMARK OFFICE
CERTIFICATE OF CORRECTION

PATENT NO. : 4,254,401
DATED : March 3, 1981
INVENTOR(S) : Murano et al.

It is certified that error appears in the above—identified patent and that said Letters Patent is hereby corrected as shown below:

Front page, [56] References Cited, for 3,978,451, "Ito"
    should be --Ito et al.--;
               for 3,979,732, "Hepworth" should be
    --Hepworth et al.--.
\*Column 1, line 7, after "to" insert --a--;
        \*line 13, delete both occurrences of ",";
        \*line 14, delete both occurrences of ",";
        \*line 17, "in" should be --is--;
        \*line 53, "mass-" should be --mass--.
\*Column 2, line 53, "gency," should be --gency--;
        \*line 56, "urgency," should be --urgency--;
        \*line 63, "example," should be --example--.
\*Column 3, line 28, "places," should be --place,--;
        line 44, "4-0," should be --(4-0,--;
        \*line 65, "PRLL" should be --PRLL.--.
\*Column 4, line 2, before "in" insert --shown--;
        \*line 4, "unit (3 in" should be --unit 3 (in--;
        \*line 7, "nel" should be --nels--;
        \*line 19, after "necessity" insert --the--;
        \*line 23, "employes" should be --employs--.
\*Column 5, line 30, after "of" insert --the--;
        \*line 35, "the both" should be --both the--;

UNITED STATES PATENT AND TRADEMARK OFFICE
CERTIFICATE OF CORRECTION

PATENT NO. : 4,254,401

DATED : March 3, 1981

INVENTOR(S) : Murano et al.

It is certified that error appears in the above—identified patent and that said Letters Patent is hereby corrected as shown below:

```
         *line 49, after "by" insert --a--;
         *line 55, "other" should be --another--;
         *line 56, "chanel" should be --channel--.
*Column 6, line 2, after "that" insert --the--;
         *line 10, "devid-" should be --divid- --;
         *line 64, delete the first ",";
         *line 65, delete ",".
*Column 7, line 11, "above de-" should be --above-de- --.
```

Signed and Sealed this

Thirteenth Day of October 1981

[SEAL]

Attest:

GERALD J. MOSSINGHOFF

Attesting Officer

Commissioner of Patents and Trademarks